United States Patent
Singh et al.

(10) Patent No.: US 12,306,949 B2
(45) Date of Patent: May 20, 2025

(54) PARA-VIRTUALIZED DRIVERS TO PREVENT NON-INTERNET PROTOCOL HYPERVISOR HYPERCALL DENIAL OF SERVICE ATTACKS

(71) Applicant: DELL PRODUCTS L.P., Round Rock, TX (US)

(72) Inventors: Ankit Singh, Bangalore (IN); Sumanth Vidyadhara, Bangalore (IN); Shrikant Hallur, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 18/170,330

(22) Filed: Feb. 16, 2023

(65) Prior Publication Data
US 2024/0281543 A1 Aug. 22, 2024

(51) Int. Cl.
*G06F 21/57* (2013.01)
*G06F 21/60* (2013.01)
*G06F 21/64* (2013.01)

(52) U.S. Cl.
CPC .......... *G06F 21/572* (2013.01); *G06F 21/602* (2013.01); *G06F 21/64* (2013.01)

(58) Field of Classification Search
CPC ...... G06F 21/602; G06F 21/572; G06F 21/64; G06F 21/44; H04L 63/12; H04L 63/123; H04L 9/30; H04L 9/32; H04L 9/3247; H04L 9/3249; H04L 9/3252; H04L 9/3263
See application file for complete search history.

(56) References Cited

U.S. PATENT DOCUMENTS

| | | | | |
|---|---|---|---|---|
| 10,063,380 | B2 * | 8/2018 | Brandwine | H04L 9/3263 |
| 10,838,942 | B2 * | 11/2020 | Basso | H04L 63/101 |
| 2016/0299851 | A1 * | 10/2016 | Mattson, Jr. | G06F 12/145 |
| 2017/0279672 | A1 | 9/2017 | Krishnan et al. | |
| 2017/0329979 | A1 * | 11/2017 | Behl | G06F 21/74 |
| 2022/0229565 | A1 | 7/2022 | Saby et al. | |
| 2023/0297411 | A1 * | 9/2023 | Tsirkin | G06F 12/10 718/1 |
| 2024/0073243 | A1 * | 2/2024 | Tsirkin | H04L 63/1458 |

* cited by examiner

*Primary Examiner* — Shaqueal D Wade-Wright
(74) *Attorney, Agent, or Firm* — Larson Newman, LLP

(57) ABSTRACT

In response to reception of a hypercall addition request, a virtual machine receives a public key. Based on the public key, the virtual machine determines whether the hypercall addition request is valid. In response to the hypercall being valid, the virtual machine adds a hypercall associated with the hypercall addition request within a hypervisor of an information handling system.

20 Claims, 4 Drawing Sheets

PARA-VIRTUALIZED DRIVERS TO PREVENT NON-INTERNET PROTOCOL HYPERVISOR HYPERCALL DENIAL OF SERVICE ATTACKS

FIELD OF THE DISCLOSURE

The present disclosure generally relates to information handling systems, and more particularly relates to para-virtualized drivers for preventing non-Internet Protocol hypervisor hypercall denial of service attacks.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a virtual machine configured to communicate with a BIOS and other hardware components within the information handling system. The first virtual machine may receive a hypercall addition request. In response to the reception of the hypercall addition request, the virtual machine may request a public key and receive the public key. Based on the public key, the virtual machine may determine whether the hypercall addition request is valid. In response to the hypercall being valid, the virtual machine may add a hypercall associated with the hypercall addition request within a hypervisor of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
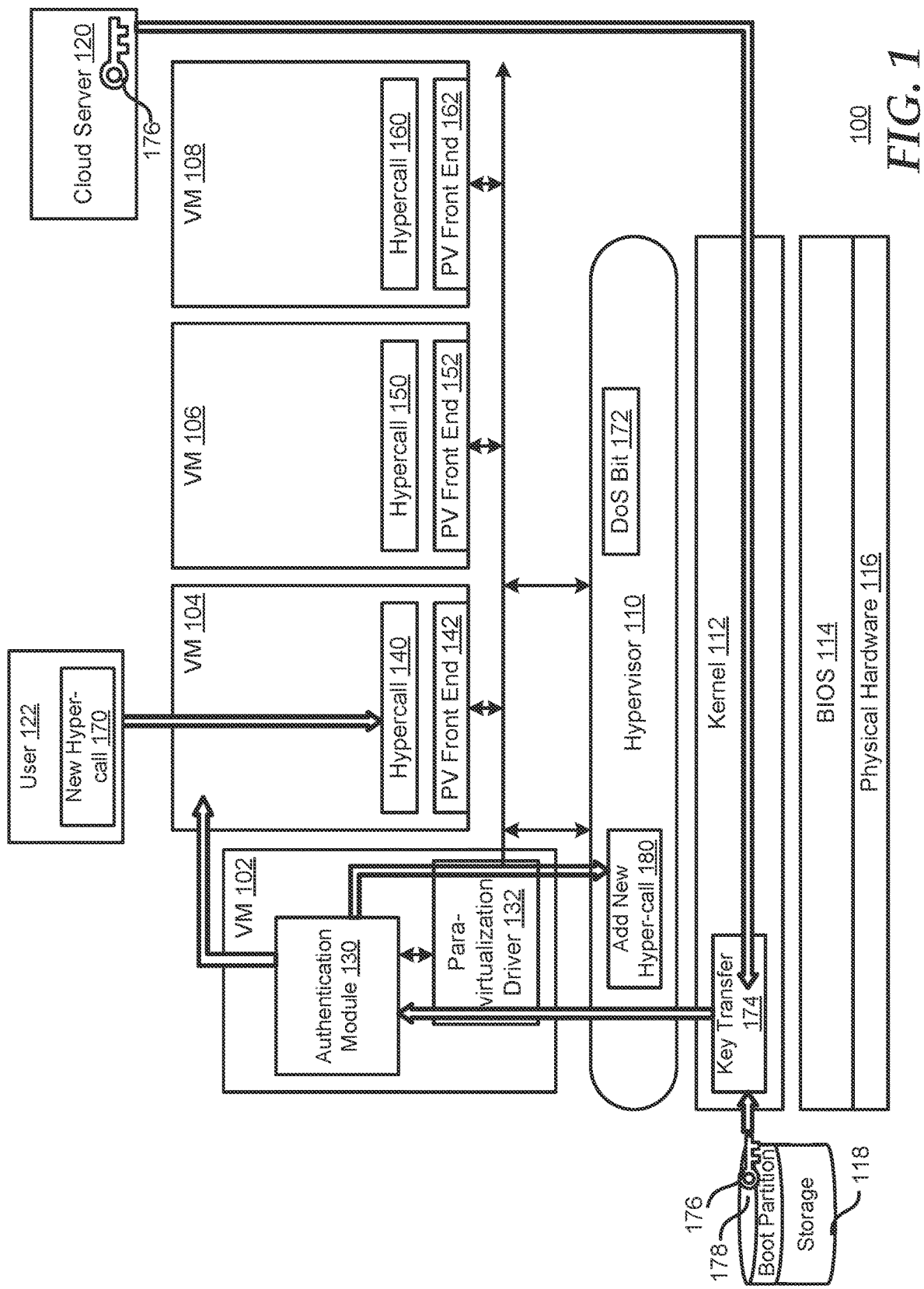
FIG. 1 is a block diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes virtual machines (VMs) 102, 104, 106, and 108, a hypervisor 110, a kernel 112, basic input/output system (BIOS) 114, physical hardware components 116, and a storage 118. Information handling system 100 may communicate with a cloud server 120. VM 102 includes an authentication module 130 and a para-virtualization driver 132. VM 104 includes a hypercall module 140 and a front end component 142. VM 106 includes a hypercall module 152 and a front end component 154. VM 108 includes a hypercall module 162 and a front end component 164. Information handling system 100 may include additional components without varying from the scope of this disclosure.

In certain examples, VMs 102, 104, 106, and 108 may be configured as any suitable device to be utilized by information handling system 100. For example, VMs 102, 104, 106, and 108 may configured as a communication server, a BIOS configuration server, a security changes server, a peripheral management server, or the like. In certain examples, VMs 102, 104, 106, and 108 may communicate with cloud server 120 and a user 122. Information handling system 100 may be improved by VM 102 being configured and operated as a domain zero (Dom0) VM within the information handling system and performing hypercall authentications. VM 102 as Dom0 may be privileged access a host and handles all other guest OS. For example, VM 102 may be the only VM loaded once the virtual machine manager has fully booted and delivers all requests for virtual machine creation, configuration, and termination.

In an example, hypervisor 110 and kernel 112 may operate while information handling system 100 is in a bare metal state as will be described herein. In certain examples, hypervisor 110 and kernel 112 may be secure components of information handling system 100 based on their operation being performed in the bare metal state of the information handling system.

In previous information handling systems, the information handling systems may have multiple solutions to detect and mitigate Internet Protocol (IP) network based denial of service (DOS) attacks. In an example, hypercalls may be used for communication between guest operating service (OS) and hypervisors. Hypervisors may support the feature of dynamically adding new hypercalls. Attackers have developed new approaches to achieving DoS conditions in clouds. For example, attackers may provide DOS attacks that are no longer packet-based, but instead the DOS attacks may be conducted over a hypercall interface. In this situation, attack packets may be malicious hypercalls that may be loaded with parameters that are out of bounds or are otherwise unexpected. These DOS attacks may focus on exhausting the hypervisor's share of CPU and memory resources. During a successful attack, the host cannot support legitimate guests, starving them of resources and forcing them offline. Information handling system 100 may be improved by authentication module 130 within VM 102 eliminating DoS hypercall attacks via signed verifications of hypercalls as will be described herein.

During operation, user 122 may generate a new hypercall addition request 170 and provide the new hypercall to the hypercall module of any one of the VMs, such as hypercall module 140 of VM 104. In response to the reception of hypercall addition request 170, hypercall module 140 may determine whether a DoS indicator BIT 172 in hypervisor 110 is set. If DoS indicator BIT 172 is set, an authenticate hypercall (AUTH_HYPER) request may be triggered in hypercall module 140. Based on the trigger of AUTH_HYPER request, hypercall module 140 may provide hypercall addition request 170 to para-virtualization driver 132 of VM 102 as Dom0. In an example, para-virtualization driver 132 may transfer hypercall addition request 170 to authentication module 130, which in turn may perform one or more operations to determine the validity of the hypercall addition request.

In certain examples, authentication module 130 may provide a public key request to key transfer module 174 of kernel 112. In response to the public key request, key transfer module 174 may retrieve a public key from any suitable location. In an example, key transfer module 174 may retrieve a public key 176 from a boot partition 178 of storage 118. Boot partition 178 may be a non-volatile memory express (NVMe) boot partition that is secured and protected from any user. In an example, NVMe boot partition 178 may only be modified using Firmware Image Download and Firmware Commit commands and may be protected against unauthorized modification with a replay protected memory block (RPMB). In certain examples, public key 176 may be part of a public/private key pair associated with an entity of information handling system 100. In an example, if public key 176 is not available in boot partition 178, key transfer module 174 of kernel 112 may retrieve the public key from cloud server 120. In response to retrieving public key 176, key transfer module 174 may provide the public key to authentication module 130.

In an example, authentication module 130 may utilize public key 176 to determine whether hypercall addition request 170 is a valid request or a DoS request. In certain examples, a valid hypercall addition request is one that is signed with a private key of the public/private key pair associated with public key 176. Based on this condition, authentication module 130 may compare a cryptographic signature of hypercall addition request 170 to public key 176 and determine whether the cryptographic signature was generated from the private key of the entity for information handling system 100.

If authentication module 130 verifies the cryptographic signature, the authentication module may enable an addition of a new hypercall 180 to hypervisor 110. In an example, the addition of a new hypercall 180 may enable hypervisor 110 to communicate with user 122 via hypercall module 140 of VM 104 and provide user access to compute resources with information handling system 100. If verification of hypercall addition request 170 fails, authentication module 130 may discard the hypercall addition request. Additionally, based on the failure of hypercall addition request 170, authentication module 130 of VM 102 may provide an error message to user 122 via a corresponding guested OS in VM 104.

Figure 2:
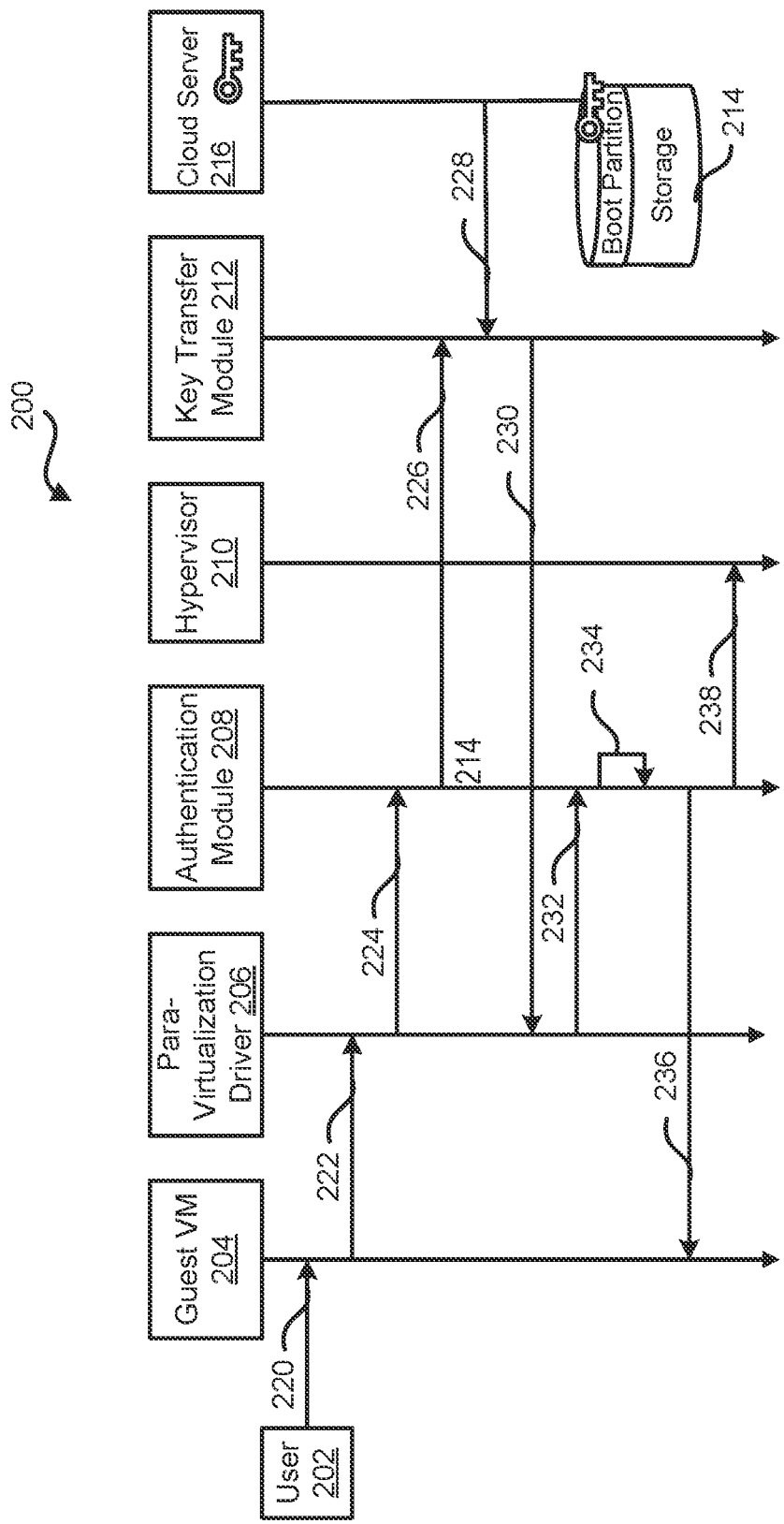
FIG. 2 is a sequence diagram of a method for authorizing hyper-calls in an information handling system according to at least one embodiment of the present disclosure.

FIG. 2 shows a method 200 for authorizing hyper-calls in an information handling system according to at least one embodiment of the present disclosure. In an example, the components of the information handling system include, but are not limited to, a user 202, a guest user 204, a para-virtualization driver 206, an authentication module 208, and a hypervisor 210, a key transfer module 212, and a storage 214. The components of the information handling system may communicate with a cloud server 216. Not every step set forth in this sequence diagram is always necessary, and certain steps of the method may be combined, performed simultaneously or in a different order, or even omitted, without varying from the scope of the disclosure.

At operation 220, user 202 sends a new hypercall addition request to guest virtual machine (VM) 204. In an example, the hypercall may a request for access to resources, such as processors or storage, in one or more of the VM within information handling system. In response to the new hypercall addition request, guest VM 204 may provide a hypervisor authentication trigger event to para-virtualization driver 206 at operation 222. In an example, para-virtualization driver 206 may be located within a domain 0 VM of the information handling system.

At operation 224, para-virtualization driver 206 provides an authentication request to authentication module 208. In response to the authentication request, authentication module 208 provides a public key request to key transfer module 212 at operation 226. In an example, the public key request may be for a public key of a public/private key pair for an entity or owner of the information handling system. At operation 228, key transfer module 212 pulls the public key. In certain examples, the public key may be pulled from cloud server 214 associated with the entity or owner, from storage 216 of the information handling system, or the like.

At operation 230, key transfer module 212 provides the public key to para-virtualization driver 206. In response to receiving the public key, para-virtualization driver 206 provides the authentication request again to authentication module 208 at operation 232. In an example, the new authentication request may include the public key. At operation 234, authentication module 208 determines whether a signature in the hypercall addition request is verified. In certain examples, the signature may be verified based on the public key. For example, authentication module may utilize the public key to determine whether the signature in the hypercall addition request was generated from the private key of the public/private key pair.

If the signature of the hypercall addition request is not verified, authentication module 208 denies the hypercall addition request and provides a request failure notification to guest VM 204 at operation 236. If the signature of the hypercall addition request is verified, authentication module 208 provides an add hypercall command to hypervisor 210 at operation 238. Based on the hypercall command, hypervisor 210 may enable guest VM 04 to access resources within the information handling system.

Figure 3:
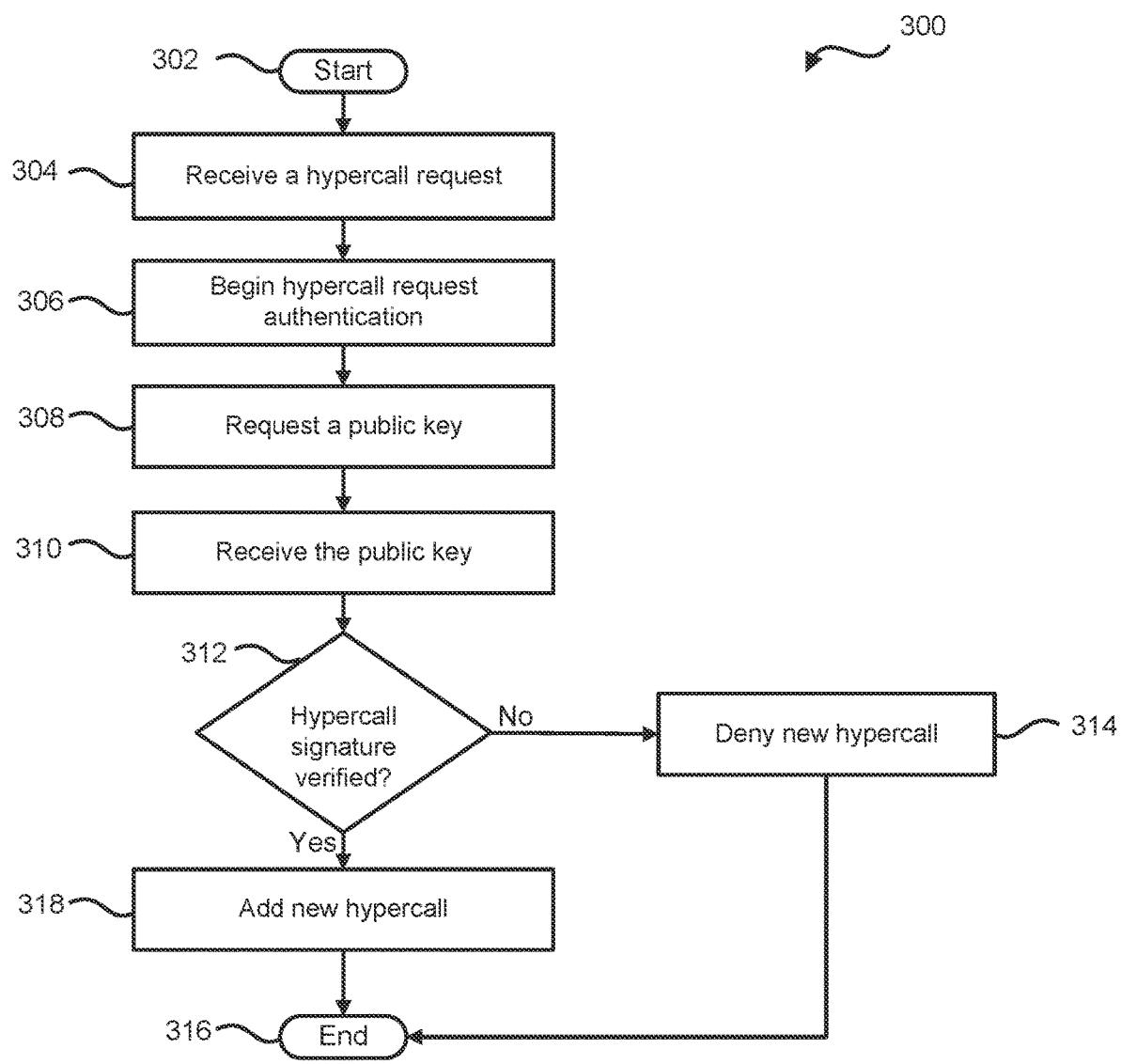
FIG. 3 is a flow diagram of a method for authorizing hyper-calls in an information handling system according to at least one embodiment of the present disclosure.

FIG. 3 shows a method 300 for authorizing hyper-calls in an information handling system according to at least one embodiment of the present disclosure, starting at block 302. In an example, the method 300 may be performed by any suitable component including, but not limited to, VMs 102, 104, 106, and 108, hypervisor 110, kernel 112, BIOS 114, authentication module 130, and other hardware components of FIG. 1. Not every method step set forth in this flow diagram is always necessary, and certain steps of the methods may be combined, performed simultaneously, in a different order, or perhaps omitted, without varying from the scope of the disclosure.

At block 304, a hypercall is received. In an example, the hypercall may a request for access to resources, such as processors or storage, in one or more of the VM within information handling system. At block 306, a hypercall addition request authentication is begun. In certain examples, the hypercall addition request authentication may begin in response to any suitable event or notification including, but not limited to, an authentication request from a para-virtualization driver to an authentication module of the information handling system. At block 308, a public key is requested. In an example, the authentication module of the information handling system may request the public key from any suitable source. For example, the source may be a cloud server, a storage device within the information handling system, or the like.

At block 310, the public key is received. In an example, the public key may be associated with an entity or owner of the information handling system. At block 312, a determination is made whether a hypercall signature is verified. In an example, the determination may be made in any suitable manner. For example, the validity of the hypercall signature may be determined based on the public key. If the hypervisor signature is not verified, the new hypercall is denied at block 314 and the flow ends at block 316. If the hypervisor signature is verified, the new hypercall is added at block 318 and the flow ends at block 316.

Figure 4:
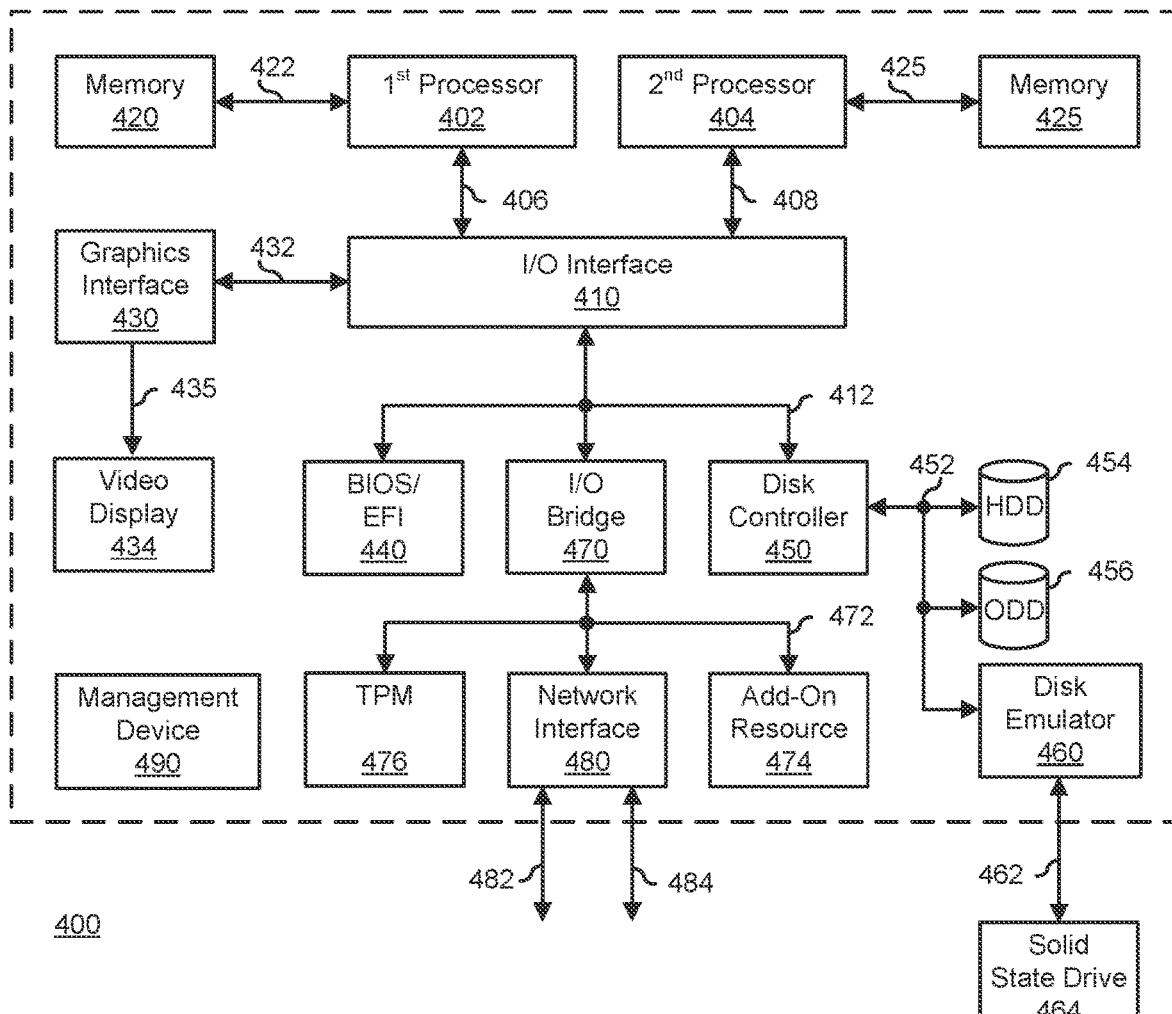
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a basic input/output system (BIOS); and
   a virtual machine configured to communicate with the BIOS and other hardware components within the information handling system, the virtual machine to:
      receive a hypercall addition request;
      determine whether a denial of service bit is set in the hypervisor of the information handling system;
      in response to the denial of service bit being set, provide the hypercall addition request to an authentication module for authentication;
      in response to the reception of the hypercall addition request, request, by the authentication module, a public key;
      receive the public key;
      based on the public key, determine whether the hypercall addition request is valid; and
      in response to the hypercall being valid, add a hypercall associated with the hypercall addition request within a hypervisor of the information handling system.

2. The information handling system of claim 1, wherein the determination of whether the hypercall addition request is valid, the virtual machine further to: determine whether a signature of the hypercall addition request is valid, wherein the signature is valid if the signature is generated based on a private key in a public/private key pair associated with the public key.

3. The information handling system of claim 1, wherein the virtual machine includes:
   a para-virtualization driver to receive the public key; and
   an authentication module perform a signature verification for the signature of the hypercall addition request.

4. The information handling system of claim 1, wherein in response to the hypercall addition request being invalid, the virtual machine further to: discard the hypercall addition request.

5. The information handling system of claim 1, wherein the virtual machine further to: in response to the hypercall addition request being invalid, discard the hypercall addition request.

6. The information handling system of claim 1, wherein the public key is received from a storage of the information handling system.

7. The information handling system of claim 6, wherein the public key is stored in a non-volatile memory express (NVMe) boot partition of the storage.

8. The information handling system of claim 1, wherein the public key is received from a cloud server.

9. A method comprising:
   receiving, in a virtual machine of an information handling system, a hypercall addition request;
   determining whether a denial of service bit is set in the hypervisor of the information handling system;
   in response to the denial of service bit being set, providing the hypercall addition request to an authentication module for authentication;
   in response to the reception of the hypercall addition request, requesting, by the authentication module, a public key;
   receiving the public key;
   based on the public key, determining whether the hypercall addition request is valid; and
   in response to the hypercall being valid, adding a hypercall associated with the hypercall addition request within a hypervisor of the information handling system.

10. The method of claim 9, wherein the determination of whether the hypercall addition request is valid, the method further comprises: determining whether a signature of the hypercall addition request is valid, wherein the signature is valid if the signature is generated based on a private key in a public/private key pair associated with the public key.

11. The method of claim 9, further comprising: in response to the hypercall addition request being invalid, discarding the hypercall addition request.

12. The method of claim 11, further comprising: providing an error message to a corresponding guest virtual machine.

13. The method of claim 9, wherein the public key is received from a storage of the information handling system.

14. The method of claim 13, wherein the public key is stored in a non-volatile memory express (NVMe) boot partition of the storage.

15. The method of claim 9, wherein the public key is received from a cloud server.

16. An information handling system comprising:
   a first virtual machine configured to communicate with a basic input/output system (BIOS) and other hardware components within the information handling system; and
   a second virtual machine to receive a hypercall addition request;
   wherein the first virtual machine is to:
      determine whether a denial of service bit is set in the hypervisor of the information handling system;
      in response to the denial of service bit being set, provide the hypercall addition request to an authentication module for authentication;
      in response to reception of the hypercall addition, request, by the authentication module, from the second virtual machine, request a public key;
      based on the public key, determine whether the hypercall addition request is valid; and
      if the hypercall is valid, then add a hypercall associated with the hypercall addition request within a hypervisor of the information handling system.

17. The information handling system of claim 16, wherein the determination of whether the hypercall addition request is valid, the virtual machine further to: determine whether a signature of the hypercall addition request is valid, wherein the signature is valid if the signature is generated based on a private key in a public/private key pair associated with the public key.

18. The information handling system of claim 16, wherein in response to the hypercall addition request being invalid, the first virtual machine further to discard the hypercall addition request.

19. The information handling system of claim 16, wherein the virtual machine provides an error message to the second virtual machine.

20. The information handling system of claim 16, wherein the public key is stored in a non-volatile memory express (NVMe) boot partition of a storage of the information handling system.

* * * * *